(12) United States Patent  (10) Patent No.: US 7,973,985 B2
Tan et al.  (45) Date of Patent: Jul. 5, 2011

(54) SCANNING DEVICE

(75) Inventors: Hin Leong Tan, Sunnyvale, CA (US); Chang-Ming Liu, Taichung (TW)

(73) Assignee: Electronic Document Technology Pte. Ltd., Singapore (SG)

( * ) Notice: Subject to any disclaimer, the term of this patent is extended or adjusted under 35 U.S.C. 154(b) by 583 days.

(21) Appl. No.: 12/077,432

(22) Filed: Mar. 17, 2008

(65) Prior Publication Data

US 2009/0231643 A1 Sep. 17, 2009

(51) Int. Cl.
*H04N 1/04* (2006.01)

(52) U.S. Cl. ........ 358/496; 358/498; 358/483; 358/408; 399/367; 399/374

(58) Field of Classification Search .................. 358/496, 358/498, 408, 483; 399/367, 374; 355/23, 355/24
See application file for complete search history.

(56) References Cited

U.S. PATENT DOCUMENTS

| 2002/0105686 A1* | 8/2002 | Hasegawa et al. ............ 358/498 |
| 2004/0008386 A1* | 1/2004 | Shiraishi ........................ 358/474 |
| 2005/0213167 A1* | 9/2005 | Shiraishi ........................ 358/474 |

* cited by examiner

*Primary Examiner* — Cheukfan Lee
(74) *Attorney, Agent, or Firm* — Douglas L. Weller

(57) ABSTRACT

A scanning device scans both sides of a document. The document is fed between a first image sensor module and a second image sensor module. The second image sensor module is moved with respect to the first image sensor module so that a separation distance between the second image sensor module and the first image sensor module is based on a thickness of the document. A first side of the document is scanned using a first scan line located in the first image sensor module. A second side of the document is scanned using a second scan line located in the second image sensor module. When the document is fed between the first image sensor module and the second image sensor module, the document does not reach the first scan line and the second scan line simultaneously.

22 Claims, 10 Drawing Sheets

SCANNING DEVICE

BACKGROUND

Currently available compact optical card scanning devices are generally single sided scanning devices that scan cards one side at a time. Additionally, currently available optical card scanning devices are typically designed to handle thinner material such as business cards, and are generally unable to accommodate thick plastic cards, and especially those that have raised or embossed lettering. Such thick rigid material tend to jam in the feeding mechanism that moves the card through the scanning device.

However, for security and commercial billing purposes, there is an increasing need to reliably capture the images of rigid laminated and plastic cards. These cards proliferate as identification material for many in different areas in the form of insurance cards, driver licenses, and credit cards. With the advance of imaging technology and digital storage, many health clinics for instance prefer to scan and save digital images of plastic insurance cards than to photocopy and save hard copies on the copy machine.

DESCRIPTION OF THE EMBODIMENT

Figure 1:
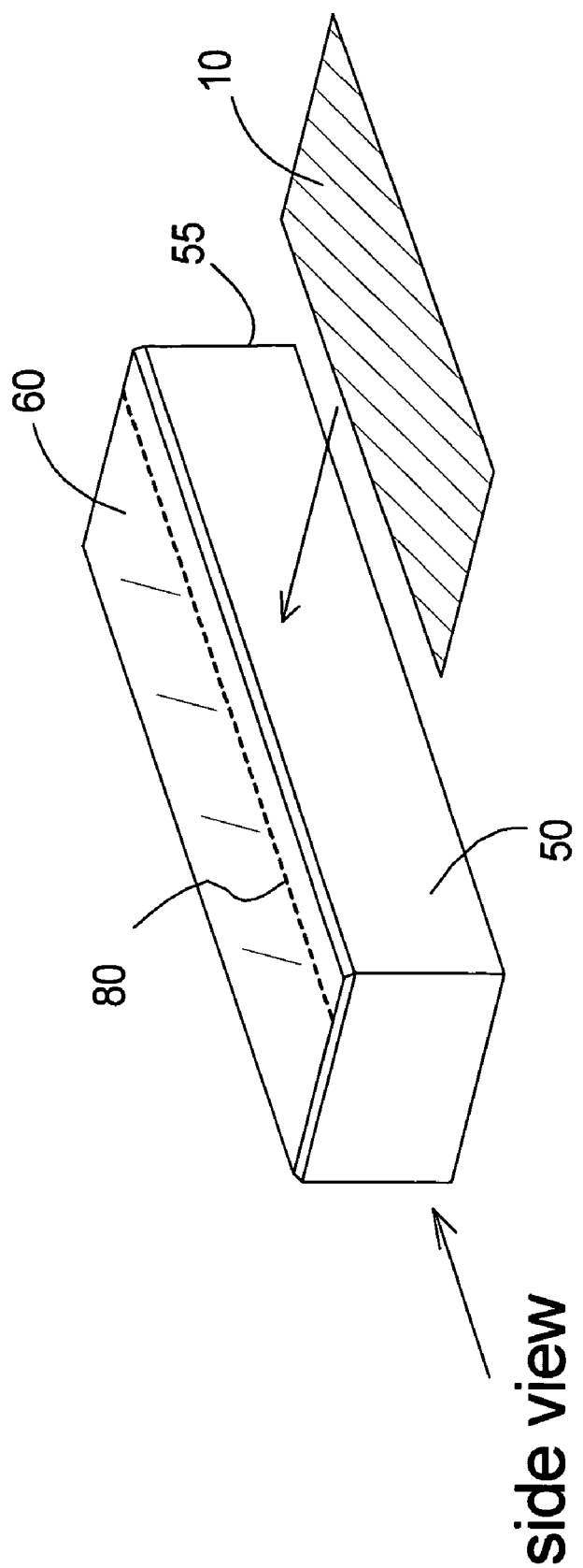
FIG. 1 is an oblique view of a typical contact imaging sensor module according to the prior art.

FIG. 1 shows an oblique view of a typical contact imaging sensor (CIS) module 50 used for scanning an input document 10. CIS module 50 includes externally of a rectangular enclosure 55 and a scan glass 60; internally CIS module 50 houses a light source, lenses and electronics circuitry to detect light reflected from an input. Document 10, when it is to be scanned, is placed to the front of CIS module 50 in contact or close proximity to scan glass 60; as document 10 is slid over the surface of scan glass 60, an array of sensors within CIS module 50 scans document 10 by detecting light intensities reflected from document 10 along scan line 80 on scan glass 60. In order to obtain a clear scan, document 10 must be very close or in contact with scan glass 60 in the proximity of scan line 80.

Figure 2:
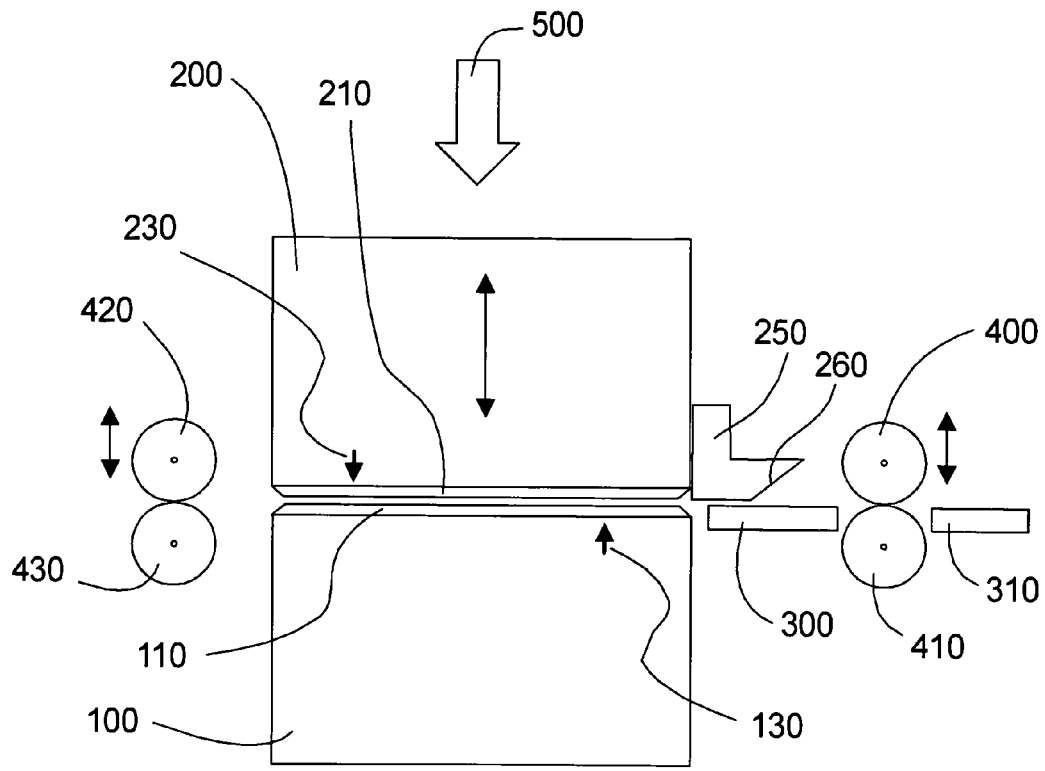
FIG. 2 is a cross-sectional view illustrating a scanning device which uses an L shaped paper guide in accordance with an embodiment of the present invention.

FIG. 2 shows the side (cross-sectional) view of an embodiment of a compact scanning device which is able to scan both sides of a document in one pass, and capable of handling business card sized documents ranging from paper-thin material to thick card stock and rigid plastic cards. The compact scanning device includes of a pair of vertically overlapping CIS modules 100 and 200 which are placed such that the scan glass of each module 110 and 210 are adjacent and facing each other, while scan lines locations 130 and 230 for each module are on opposite sides. The pair of CIS modules can be fully or partially overlapping. Lower CIS module 100 is affixed to the scanning device housing such that document input platform 300 and 310 is coplanar with scan glass 110. A pair of input rollers 400 and 410 are mounted on the front of the device such that lower input roller 410 is fixed and coplanar with input platform 300 and scan glass 110 so that documents move through the scanning device on a flat document path. Upper input roller 400 is in contact with lower roller 410, but is vertically movable so that it can accommodate varying thickness of input material. Similarly, a pair of output rollers 420 and 430 are placed at the rear of the scanning device: lower roller 430 is fixed and coplanar with scan glass 110, while upper roller 420 is vertically movable. Optionally, a light force 500 is applied using a spring device from the direction of upper CIS module 200 towards lower CIS module 100 to keep the scan glass of the two CIS modules in close proximity.

Upper CIS module 200 is mounted vertically above lower CIS module 100 such that CIS module 200 is vertically movable and rests just above lower CIS module 100. A paper guide 250 is mounted at the front of CIS module 200 such that the bottom of paper guide 250 is approximately co-planar with scan glass 210. Paper guide 250 is an L shaped structure that has a ramp edge 260 facing toward the front of the device. In the embodiment shown in FIG. 2, paper guide 250 is mounted directly onto CIS module 200.

Figure 3:
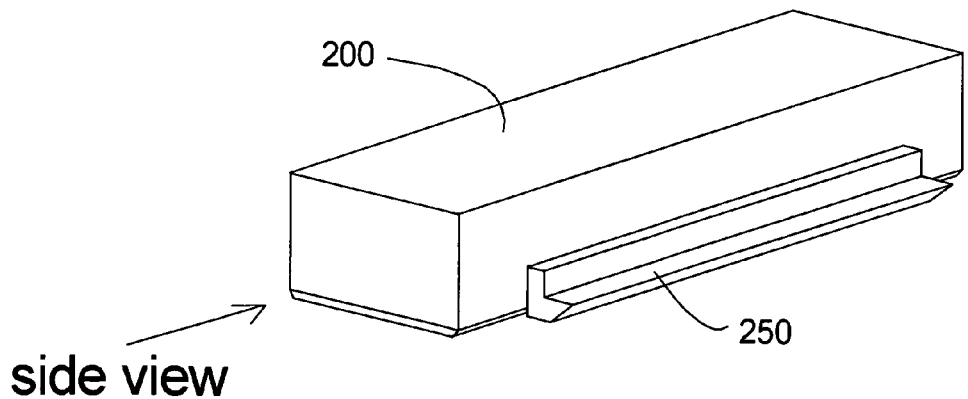
FIG. 3 is an oblique view of an L shaped paper guide which is a continuous longitudinal structure affixed to the side of an upper contact imaging sensor module in accordance with an embodiment of the present invention.

In one embodiment paper guide 250 is a single continuous longitudinal structure as shown in the oblique view in FIG. 3.

Figure 4:
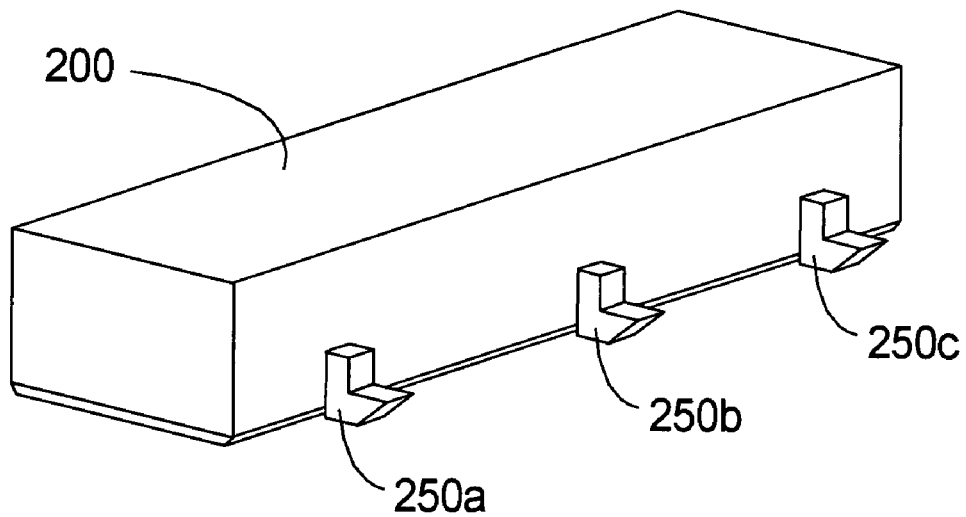
FIG. 4 is an oblique view of a paper guide which is comprised of three discrete L shaped structures affixed to the side of the upper contact imaging sensor module in accordance with an embodiment of the present invention.

In another embodiment shown in FIG. 4, paper guide 250 is comprised of three discrete structures 250a, 250b and 250c mounted along the longitudinal edge of CIS module 200.

Figure 5:
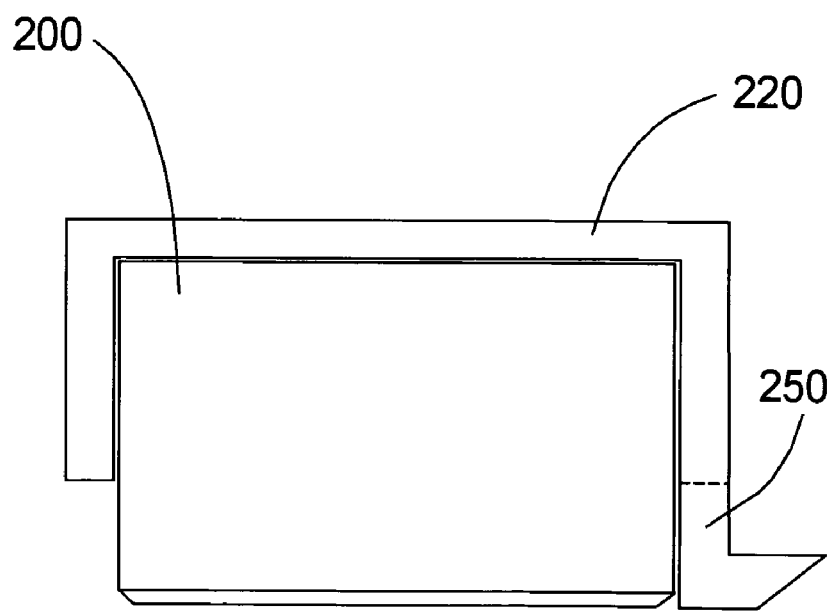
FIG. 5 is a cross sectional view of an L shaped paper guide which is combined with the contact imaging sensor support housing to form a single structure in accordance with an embodiment of the present invention.

In a third embodiment shown in FIG. 5, paper guide 250 includes of a single longitudinal structure or multiple discrete structures which are affixed or fused with a movable CIS support housing 220 that holds CIS module 200.

Figure 6:
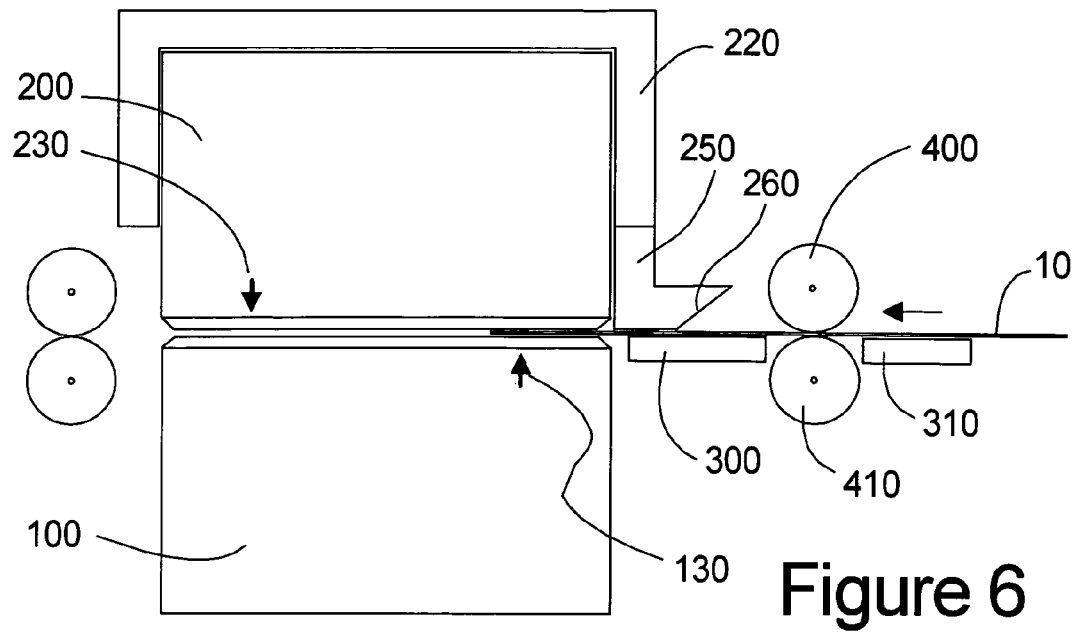
FIG. 6 is a cross-sectional view of the scanning device with an L shaped paper guide illustrating the movement of a thin document through the device during the scanning operation in accordance with an embodiment of the present invention.

As shown in FIG. 6, a thin document 10 is scanned by placing it at the front of the device on input platform 310 and pushing it into the nip between input rollers 400 and 410. The input rollers which are powered by a stepper motor pull document 10 into the device so that it slides below paper guide 250 and between the scanning glass of CIS modules 100 and 200. Lower CIS module 100 scans the lower face of input document as it passes over scan line 130; upper CIS module 200 scans the upper face of document 10 as it passes over scan line 230. When the lead edge of document 10 reaches the output rollers, the rollers pull document 10 through the device until the trailing edge of document 10 moves past scan line 230. Document 10 can then be ejected at the front or rear of the device.

Figure 7:
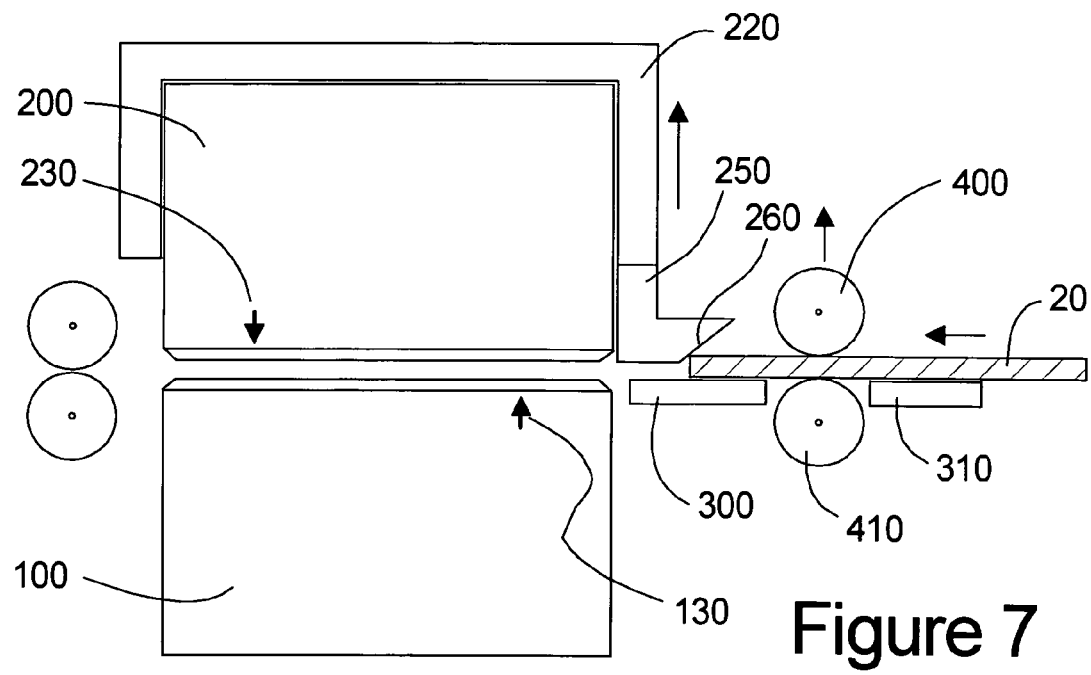
FIG. 7 is a cross-sectional view of the scanning device with an L shaped paper guide illustrating the movement of a thick document through the device during the scanning operation in accordance with an embodiment of the present invention.

In FIG. 7, a thick document 20 is scanned in the same way as a thin document by placing it at the front of the device on input platform 310 and pushing it into the nip between input rollers 400 and 410. Upper input roller 400 rotates and moves vertically upwards to accommodate the thick document between the rollers. When document 20 reaches paper guide 250, it pushes against ramp edge 260 and forces paper guide 250 to move upwards together with support housing 220 and CIS module 200. Document 20 then continues to slide through the opened gap between the upper and lower CIS modules and is scanned as it passes through.

Figure 8:
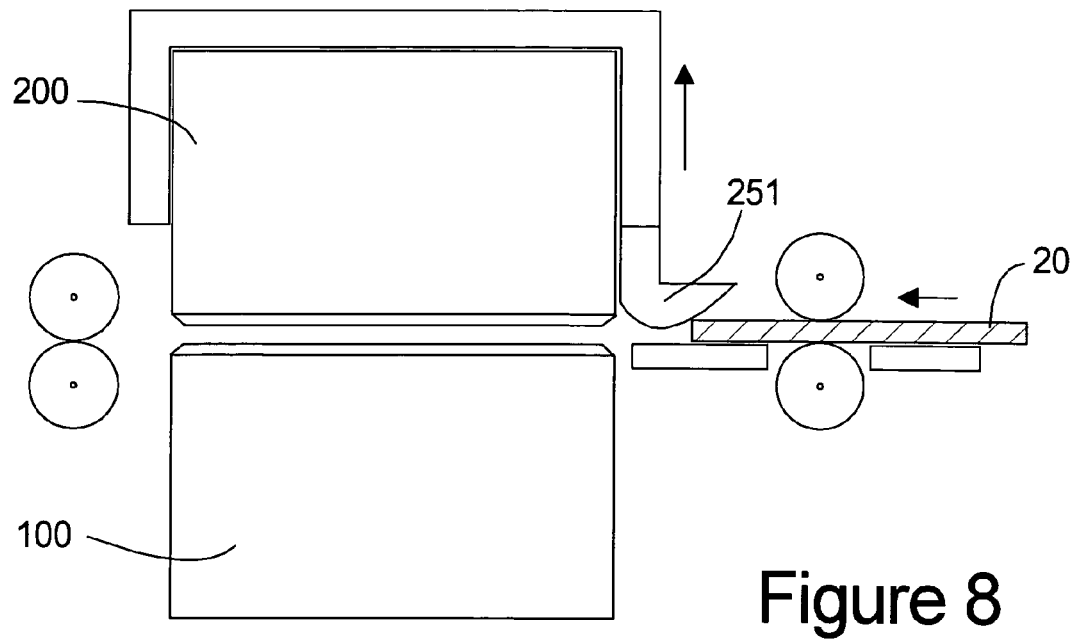
FIG. 8 is a cross-sectional view of an alternative embodiment of the paper guide which has a convex slope facing the input rollers in accordance with an embodiment of the present invention.
Figure 9:
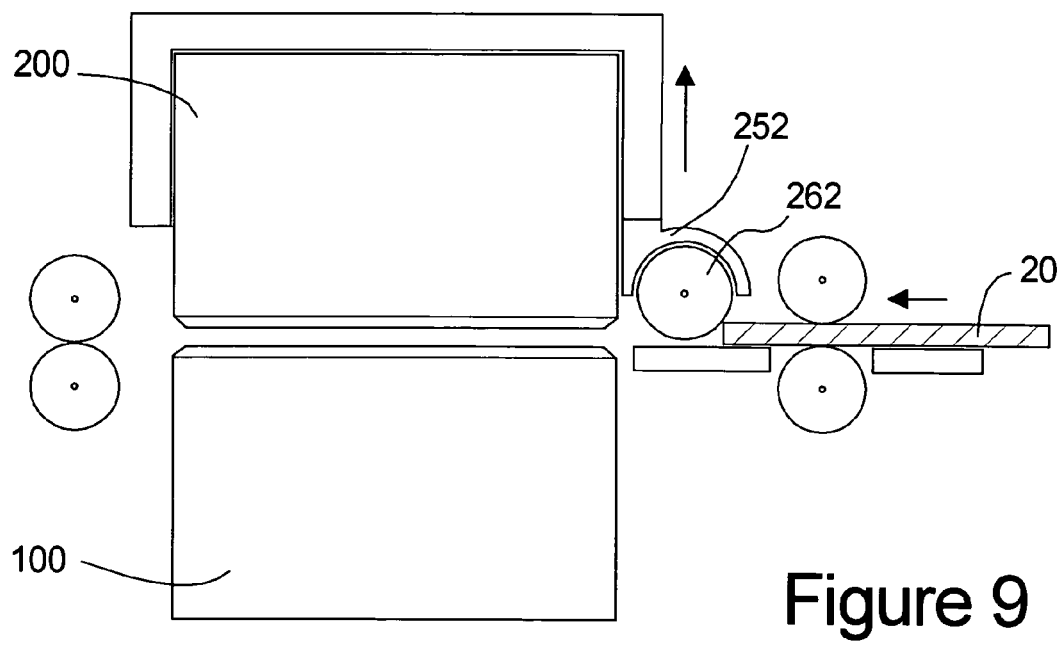
FIG. 9 is a cross-sectional view of an alternative embodiment of the paper guide which includes a roller and housing in accordance with an embodiment of the present invention.

FIGS. 8 and 9 show alternative structures for paper guide 250 shown in FIGS. 6 and 7. FIG. 8 shows an L shaped paper guide 251 which incorporates a convex slope facing the front of the scanning device. When a thick document 20 is inserted into the scanning device, it pushes against the convex slope of paper guide 251 which causes the guide to move upwards together with CIS module 200. FIG. 9 shows a paper guide which includes of a roller housing 252 supporting a rigid roller 262. When a thick document 20 is inserted into the scanning device, it pushes against roller 262 which causes roller and housing 252 to move upwards together with CIS module 200.

Figure 10:
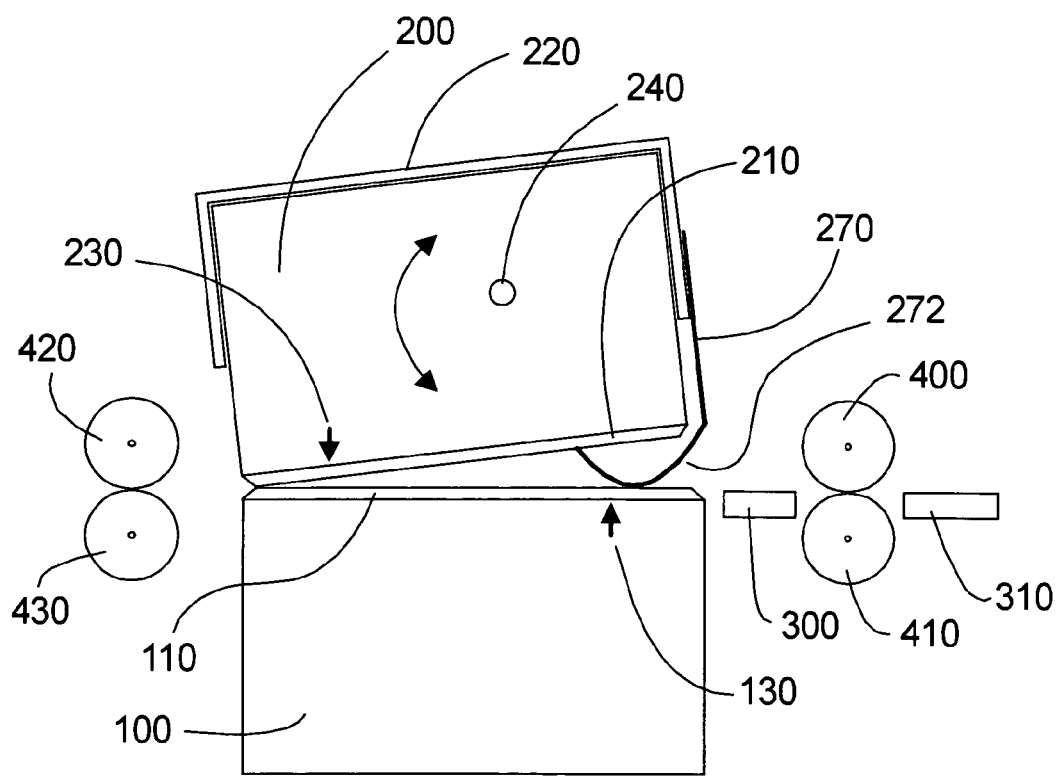
FIG. 10 is a cross-sectional view illustrating one embodiment of the scanning device which uses a J shaped paper guide wherein the upper contact imaging sensor module is pivoted about a fixed axis that is parallel to the longitudinal edge of the contact imaging sensor module in accordance with an embodiment of the present invention.

FIG. 10 shows another embodiment of a duplex compact scanning device which uses a flexible paper guide 270. In FIG. 10, lower CIS module 100, input rollers 400 and 410, output rollers 420 and 430, and input platform 300 and 310 are all set up in the same manner and perform the same functions as the same parts described in FIG. 2. In the embodiment shown in FIG. 10, paper guide 270 causes upper CIS module 200 to tilt (i.e., pivot around a fixed point 240) with respect to lower CIS module 100. This is in contrast to the embodiments shown in FIGS. 2 through 9 where the various embodiments of the paper guides causes all of CIS upper module 200 to move a uniform distance away from lower CIS module 100.

Figure 11A:
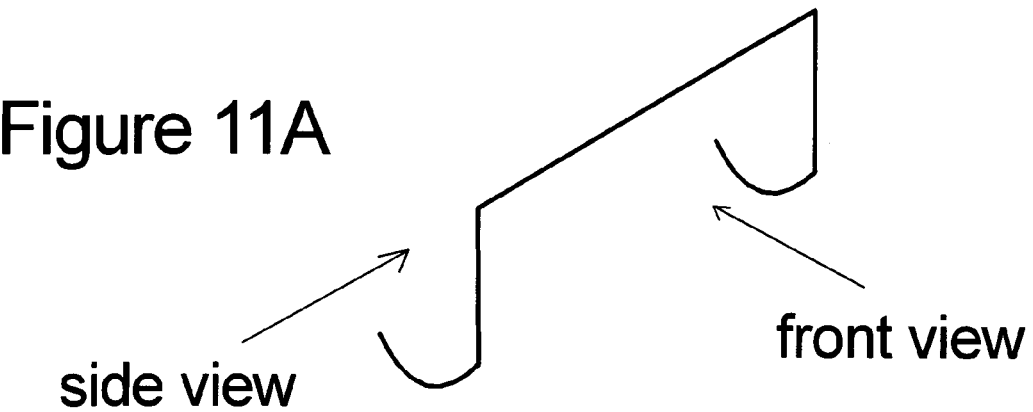
FIGS. 11A, 11B, and 11C show J shaped paper guides in accordance with embodiments of the present invention.
Figure 11B:
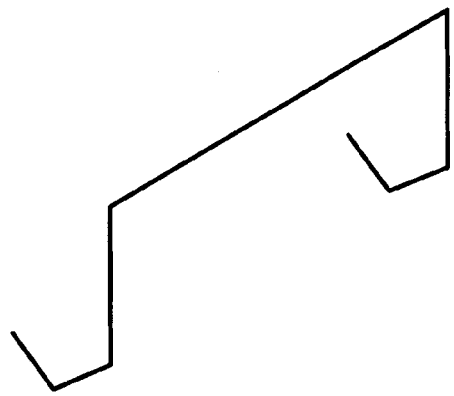
Figure 11C:
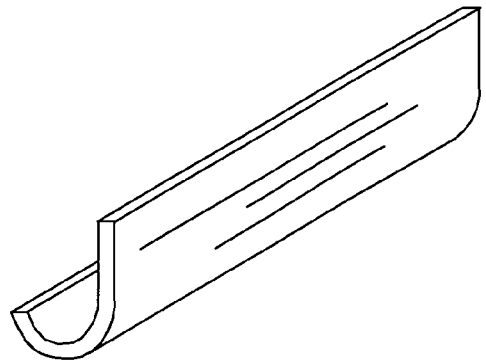

FIG. 11A shows an oblique view of one embodiment of paper guide 270 used in FIG. 10. This is a thin flexible wire shaped into a structure comprising of a pair of Js which are connected by a longitudinal bar at the top. FIG. 11B shows an alternative embodiment of the J shaped paper guide 270 where the lower tail portion of the J is V shaped. Metal or other flexible material structures with multiple J shapes is one of several possible embodiments of flexible paper guide 270 show in FIG. 10. FIG. 11C shows another embodiment of paper guide 270 which is a single continuous J shaped longitudinal structure along the length of the CIS module on which it is mounted. The lower tail portion of the J can be a smooth curve as shown in FIG. 11C, or V shaped. Referring to FIG. 10, when paper guide 270 is viewed from the side (cross-section), it presents a convex slope 272 facing front input rollers 400 and 410, the slope being deformable, and which pushes an input document against opposing scan glass 110 as a document is slid across the glass surface for scanning.

As shown in FIG. 10, paper guide 270 is affixed to the side of CIS support housing 220 such that the tail of the J shaped paper guide is below scan glass 210. In another embodiment, paper guide 270 is affixed directly to the side of CIS module 200, similarly with the tail of the J shape below scan glass 210. Upper CIS module 200 with affixed paper guide 270 is mounted vertically above lower CIS module 100 such that the left end of scan glass 210 rests on scan glass 110 of lower CIS module 100, and the lowest point of paper guide 270 is just above the surface of scan glass 110. Upper CIS module 200 is pivoted at a fixed point 240, and is free to rotate about this point.

Figure 12:
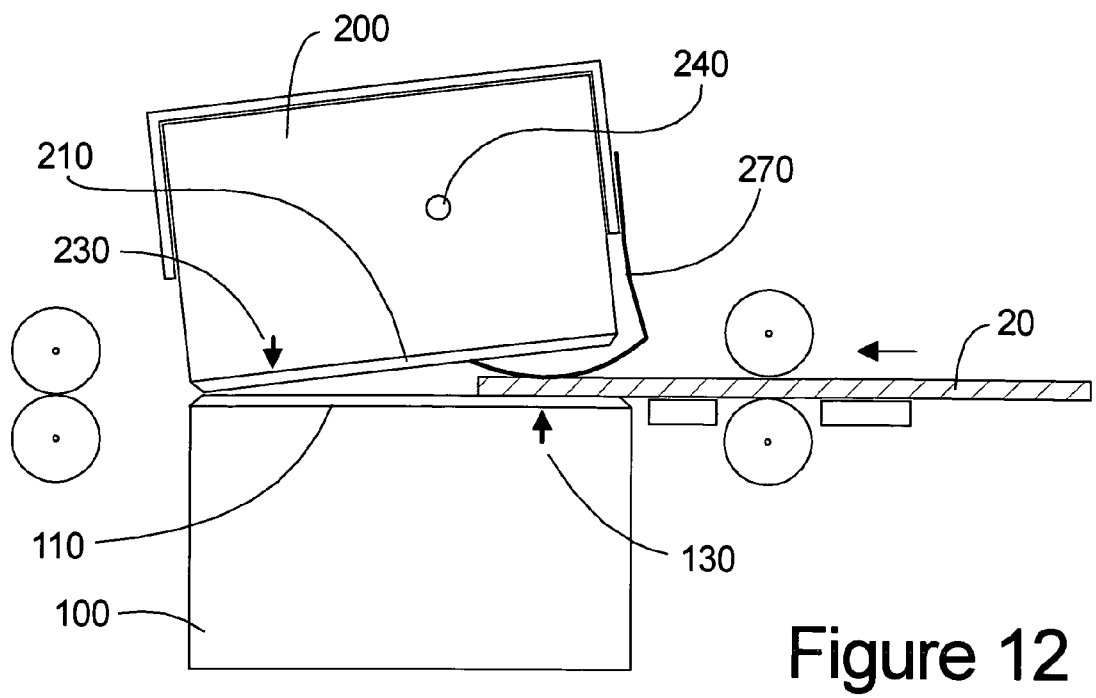
FIG. 12 is a view of the scanning device with a J shaped paper guide illustrating the movement of a thick document passing below the paper guide during the scanning operation in accordance with an embodiment of the present invention.
Figure 13:
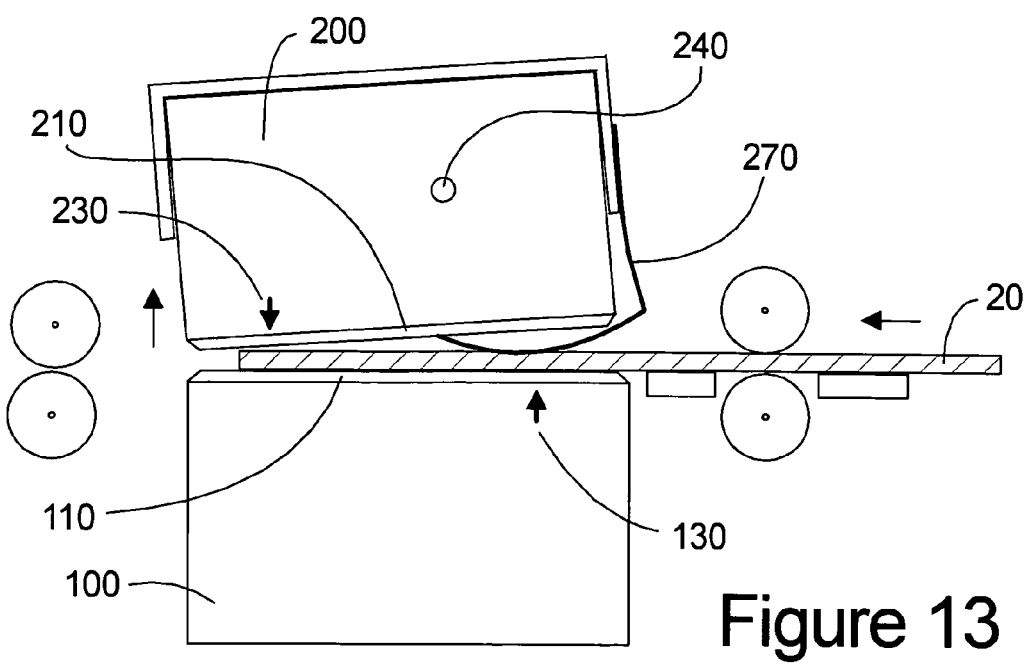
FIG. 13 is a view of the scanning device with a J shaped paper guide illustrating the movement of a thick document passing between the scan glass during the scanning operation in accordance with an embodiment of the present invention.

FIG. 12 shows the operation of the scanning device to scan a thick document 20. Document 20 is pulled into the device by the input rollers, and impinges on paper guide 270. Thick document 20 squeezes paper guide 270 so that it deforms and flattens out toward upper scan glass 210. Paper guide 270 at the same time reactively pushes thick document 20 against the surface of lower scan glass 110 in the proximity of scan line 130. As shown in FIG. 13, the input rollers push document 20 from right to left across scan glass 110. When document 20 travels to the left end of the CIS modules, it impinges on upper scan glass 210, and pushes left end of upper CIS module 200 upwards so that CIS module 200 rotates clockwise about pivot point 240. Document 20 slides under upper scan glass 210 in close proximity to glass surface at scan line 230. The close proximity of document 20 with the scan glass at scan line locations 130 and 230 enables the CIS modules to capture a clear scan of document 20 along the scan lines. Document 20 continues in motion until it reaches the output rollers which pull document 20 through until the right end of document 20 passes scan line 230.

Figure 14:
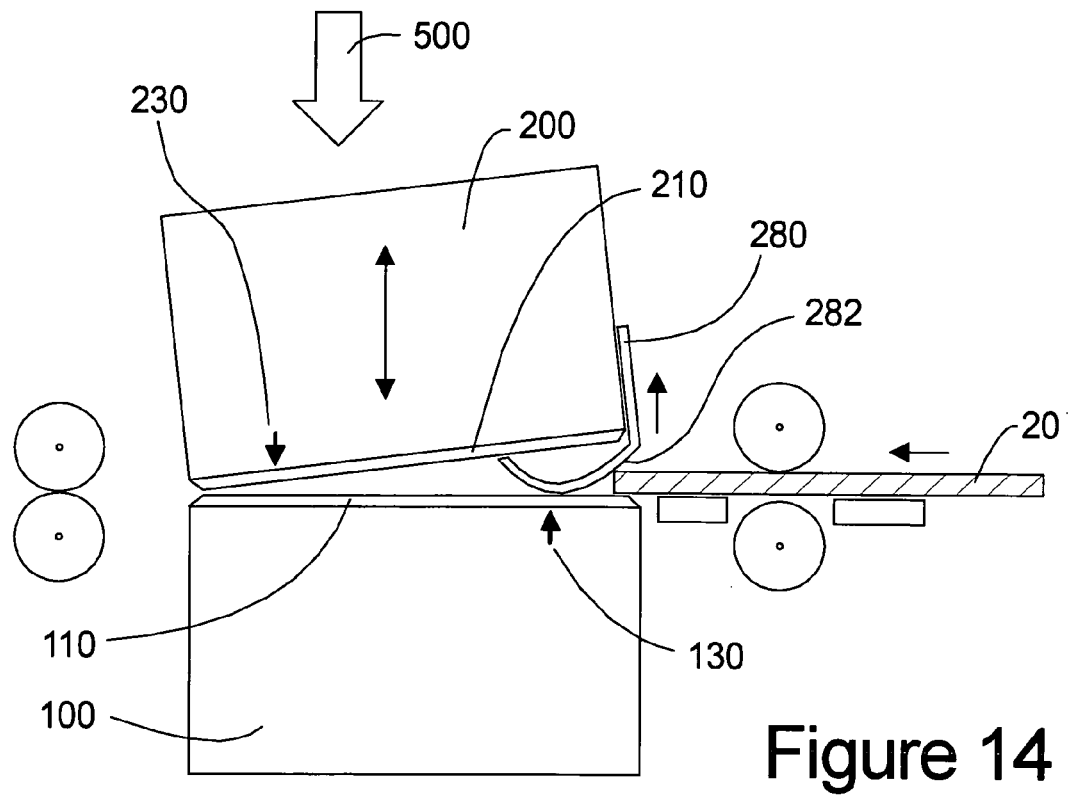
FIG. 14 is a view of the scanning device which uses a J shaped paper guide wherein the upper CIS module is vertically movable, illustrating the upward movement of the front edge of the upper CIS module in accordance with an embodiment of the present invention.
Figure 16:
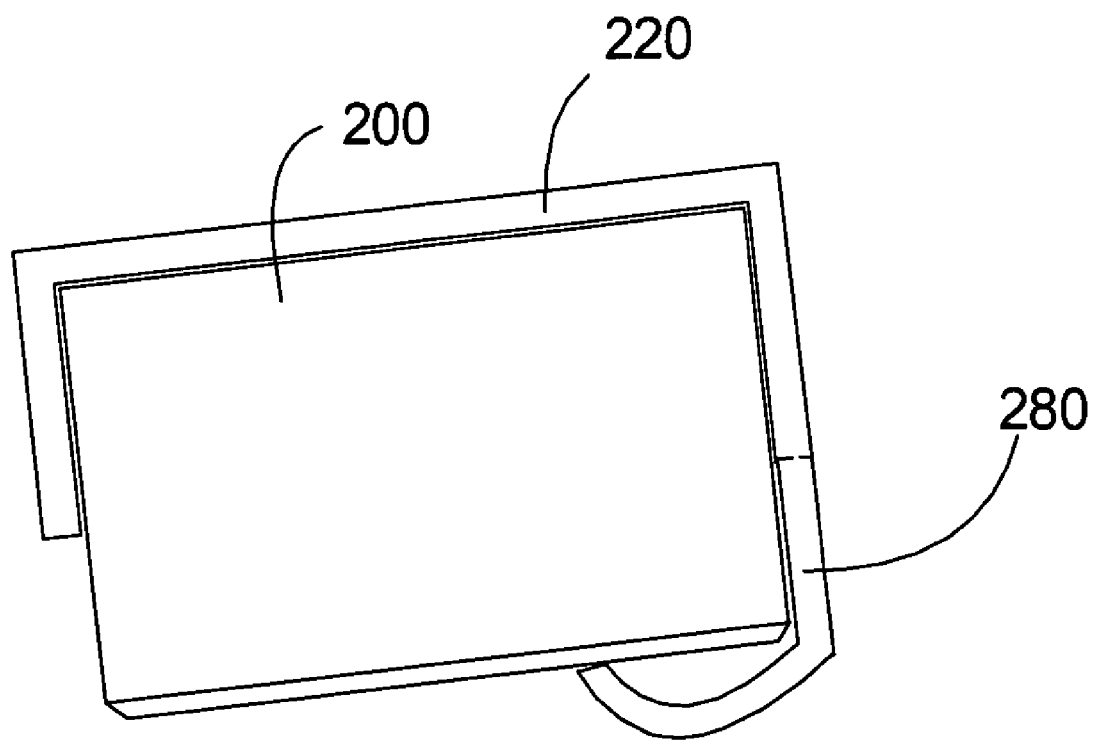
FIG. 16 is a cross sectional view of a J shaped paper guide which is combined with the CIS support housing to form a single structure in accordance with an embodiment of the present invention.

FIG. 14 shows another embodiment of a duplex compact scanning device which uses either a flexible or rigid paper guide 280. As shown in FIG. 14, lower CIS module 100, the input rollers and output rollers, and the input platform are all set up in the same manner and perform the same functions as the same parts described in FIG. 10. Paper guide 280 is made from rigid or flexible material. Paper guide 280 can be comprised of multiple discrete J shaped structures similar to that shown in FIGS. 11A and 11B, or it can be a single continuous J shaped longitudinal structure along the length of the CIS module on which it is mounted as shown in FIG. 11C. As seen in FIG. 14, when paper guide 280 is viewed from the side (cross-section), it presents a convex slope 282 facing the front input rollers, where the slope pushes an input document against opposing scan glass 110 as document 20 is slid across the glass surface for scanning. Paper guide 280 is affixed to the side of CIS module 200 such that the tail of J shaped paper guide 280 is below scan glass 210. In another embodiment, paper guide 280 is affixed to the side of the CIS support housing. In a third embodiment shown in FIG. 16, paper guide 280 is combined with CIS support housing 220 to form a single unified structure. Upper CIS module 200 with affixed paper guide 280 is mounted vertically above lower CIS module 100 such that the left end of scan glass 210 rests on the left side of scan glass 110 of the lower CIS module 100, and paper guide 280 rests on the right side of scan glass 110. Upper CIS module 200 is vertically movable. Optionally, a light force 500 is applied using a spring device from the direction of the upper CIS module 200 towards lower CIS module 100 to keep the two CIS modules in close proximity.

Figure 15:
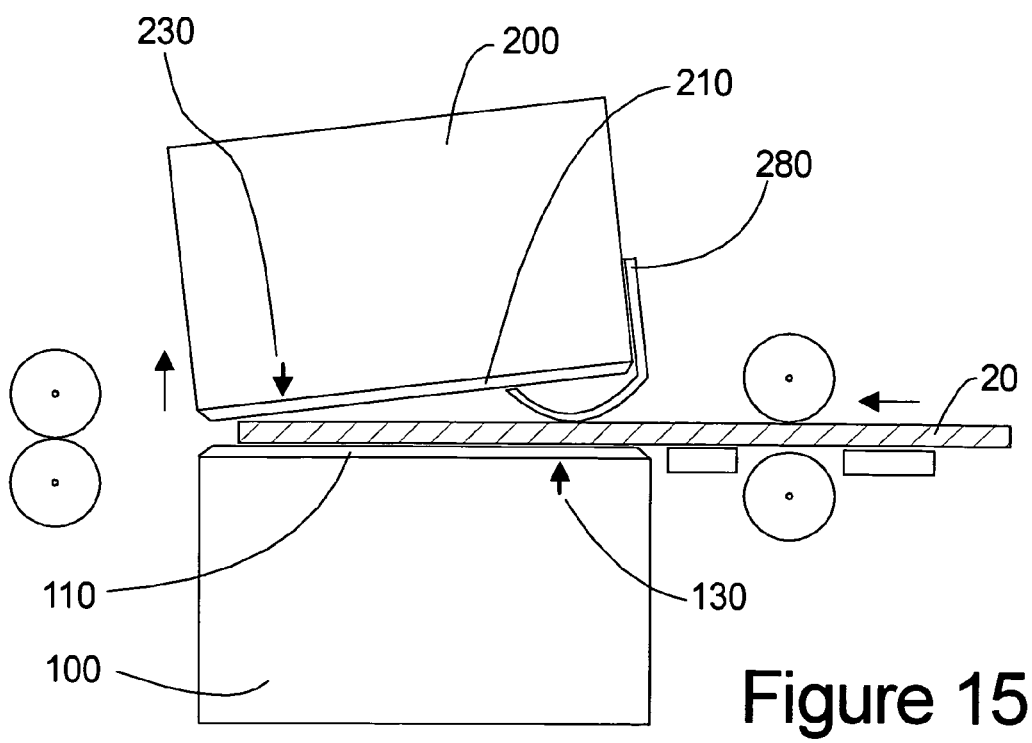
FIG. 15 is a view of the scanning device which uses a J shaped paper guide wherein the upper CIS module is vertically movable, illustrating the upward movement of the rear edge of the upper CIS module in accordance with an embodiment of the present invention.

As shown in FIG. 14, when a thick document 20 is inserted into the scanning device, document 20 moves left and impinges against convex slope 282 of paper guide 280 and pushes it upwards. This upward movement causes the upper CIS module 200 to lift and tilt at the right end, so that document 20 slides under the guide. Paper guide 280 at the same time reactively pushes document 20 against the surface of lower scan glass 110 in the proximity of scan line 130. As document 20 travels to the left end of the CIS modules, it impinges on upper scan glass 210, and pushes the left end of upper CIS module 200 upwards as shown in FIG. 15. This upward movement causes the upper CIS module 200 to lift and tilt at the left end. Document 20 slides under upper scan glass 210 in close proximity to the glass surface at scan line 230. Document 20 continues in motion until document 20 reaches the output rollers which pull document 20 through until the right end of document 20 passes scan line 230.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

Various embodiments of the present invention have been shown where the input platform is aligned in a horizontal direction so that the document is fed in a sideways direction between the first image sensor module and the second image sensor module. Alternatively, the input platform is aligned in a vertical direction so that the document is fed in a downward direction between the first image sensor module and the second image sensor module.

We claim:

1. A scanning device comprising:
an input platform;
a first image sensor module, the first image sensor module having a first scan line for scanning information from a first side of a document;
a second image sensor module, the second image sensor module being mounted opposite the first image sensor module so that the document moves from the input platform to locations directly between the first image sensor module and the second image sensor module, the second image sensor module having a second scan line for scanning information from a second side of the document; and,
a paper guide attached to the second image sensor module;
wherein when the document moves from the input platform to locations between the first image sensor module and the second image sensor module, the document causes the second image sensor module to move with respect to the first image sensor module and to thus vary separation distance between the second image sensor module to move with respect to the first image sensor module based on a thickness of the document.

2. A scanning device as in claim 1 additionally comprising:
a pair of input rollers mounted near the input platform, the input rollers feeding the document to locations between the first image sensor module and the second image sensor module.

3. A scanning device as in claim 1 additionally comprising:
a pair of input rollers mounted near the input platform, the input rollers feeding the document to locations between the first image sensor module and the second image sensor module; and,
a pair of output rollers, wherein the output rollers remove the document from between the first image sensor module and the second image sensor module so that documents move through the scanning device on a flat document path.

4. A scanning device as in claim 1 wherein the paper guide is integrated to form part of support housing that supports the second image sensor module.

5. A scanning device as in claim 1 wherein the paper guide is a continuous structure that substantially extends along an edge of the second image sensor module that is closest to the input platform.

6. A scanning device as in claim 1 additionally comprising a spring device that applies force to the second image sensor module in a direction towards the first image sensor module.

7. A scanning device as in claim 1 wherein the input platform is aligned in a vertical direction so that the document is fed in a downward direction between the first image sensor module and the second image sensor module.

8. A scanning device as in claim 1 wherein the input platform is aligned in a horizontal direction so that the document is fed in a sideways direction between the first image sensor module and the second image sensor module.

9. A scanning device as in claim 1 wherein when the second image sensor module moves with respect to the first image sensor module, the second image sensor module rotates around a fixed axis.

10. A scanning device as in claim 1 wherein the paper guide is a J shaped paper guide that tilts a glass face of the second image sensor module with respect to a glass face of the first image sensor module.

11. A scanning device as in claim 1 wherein the paper guide is a J shaped paper guide and a glass face of the second image module is tiled with respect to a glass face of the first image sensor module.

12. A scanning device as in claim 1 wherein the paper guide is a J shaped paper guide that rests on a glass face of the first image sensor module.

13. A scanning device as in claim 1 wherein a distance between the first scan line and the input platform is shorter than a distance between the second scan line and the input platform.

14. A scanning device comprising:
an input platform;
a first image sensor module, the first image sensor module having a first scan line for scanning information from a first side of a document;
a second image sensor module, the second image sensor module being mounted opposite the first image sensor module so that the document moves from the input platform to locations between the first image sensor module and the second image sensor module, the second image sensor module having a second scan line for scanning information from a second side of the document; and,
a paper guide attached to the second image sensor module;
wherein when the document moves from the input platform to locations between the first image sensor module and the second image sensor module, the document causes the second image sensor module to move with respect to the first image sensor module and to thus vary separation distance between the second image sensor module to move with respect to the first image sensor module based on a thickness of the document; and, wherein the paper guide includes multiple discrete structures that are mounted along an edge of the second image sensor module that is closest to the input platform.

15. A scanning device comprising:
an input platform;
a first image sensor module, the first image sensor module having a first scan line for scanning information from a first side of a document;
a second image sensor module, the second image sensor module being mounted opposite the first image sensor module so that the document moves from the input platform to locations between the first image sensor module and the second image sensor module, the second image sensor module having a second scan line for scanning information from a second side of the document; and,
a paper guide attached to the second image sensor module;
wherein when the document moves from the input platform to locations between the first image sensor module and the second image sensor module, the document causes the second image sensor module to move with respect to the first image sensor module and to thus vary separation distance between the second image sensor module to move with respect to the first image sensor module based on a thickness of the document; and,
wherein the paper guide includes a roller and roller housing.

16. A scanning device comprising:
an input platform;
a first image sensor module, the first image sensor module having a first scan line for scanning information from a first side of a document;
a second image sensor module, the second image sensor module being mounted opposite the first image sensor module so that the document moves from the input platform to locations between the first image sensor module and the second image sensor module, the second image sensor module having a second scan line for scanning information from a second side of the document; and,
a paper guide attached to the second image sensor module;
wherein when the document moves from the input platform to locations between the first image sensor module and the second image sensor module, the document causes the second image sensor module to move with respect to the first image sensor module and to thus vary separation distance between the second image sensor module to move with respect to the first image sensor module based on a thickness of the document; and,
wherein when the second image sensor module moves with respect to the first image sensor module, all of the second image sensor module moves a uniform distances away from the first image sensor module.

17. A method for allowing a scanning device to scan both sides of a document, comprising:
feeding the document directly between a first image sensor module and a second image sensor module;
moving the second image sensor module with respect to the first image sensor module so that a separation distance between the second image sensor module and the first image sensor module is based on a thickness of the document;
scanning a first side of the document using a first scan line located in the first image sensor module; and,
scanning a second side of the document using a second scan line located in the second image sensor module;
wherein when the document is fed between the first image sensor module and the second image sensor module, the document does not reach the first scan line and the second scan line simultaneously.

18. A method as in claim 17 wherein when the second image sensor module moves with respect to the first image sensor module, the second image sensor module rotates around a fixed axis.

19. A method as in claim 17 wherein when the second image sensor module moves with respect to the first image sensor module, the second image sensor module lifts and tilts with respect to the first image sensor module.

20. A method for allowing a scanning device to scan both sides of a document, comprising:
feeding the document between a first image sensor module and a second image sensor module;
moving the second image sensor module with respect to the first image sensor module so that a separation distance between the second image sensor module and the first image sensor module is based on a thickness of the document;
scanning a first side of the document using a first scan line located in the first image sensor module; and,
scanning a second side of the document using a second scan line located in the second image sensor module;
wherein when the document is fed between the first image sensor module and the second image sensor module, the document does not reach the first scan line and the second scan line simultaneously; and,
wherein when the second image sensor module moves with respect to the first image sensor module, all of the second image sensor module moves a uniform distances away from the first image sensor module.

21. A scanning device, comprising:
first module means for scanning a first side of the document; and,
second module means for scanning a second side of the document;
feeding means for feeding a document directly between the first module means and the second module means; and,
separating means for separating the first module means from the second module means when a document is fed therebetween, so that a separation distance between the first module means and the second module means is based on a thickness of the document;
wherein the first module means starts scanning the first side of the document at a different time than the second module means starts scanning the second side of the document.

22. A scanning device as in claim 21 wherein when the separating means causes the second module means to move with respect to the first module means, the second module means rotates around a fixed axis.

* * * * *